US007680595B2

(12) United States Patent
Brinton et al.

(10) Patent No.: US 7,680,595 B2
(45) Date of Patent: Mar. 16, 2010

(54) METHOD AND APPARATUS TO UTILIZE GPS DATA TO REPLACE ROUTE PLANNING SOFTWARE

(75) Inventors: Brett Brinton, Bellevue, WA (US); Charles Michael McQuade, Issaquah, WA (US)

(73) Assignee: Zonar Systems, Inc., Seattle, WA (US)

( * ) Notice: Subject to any disclaimer, the term of this patent is extended or adjusted under 35 U.S.C. 154(b) by 351 days.

(21) Appl. No.: 11/675,502

(22) Filed: Feb. 15, 2007

(65) Prior Publication Data

US 2007/0294031 A1 Dec. 20, 2007

Related U.S. Application Data

(63) Continuation-in-part of application No. 11/425,222, filed on Jun. 20, 2006, now Pat. No. 7,564,375.

(51) Int. Cl.
*G01C 21/30* (2006.01)

(52) U.S. Cl. .................. 701/209; 701/210; 340/995.19

(58) Field of Classification Search ................. 701/210, 701/209; 340/995.1, 995.19

See application file for complete search history.

(56) References Cited

U.S. PATENT DOCUMENTS

| | | | | |
|---|---|---|---|---|
| 4,025,791 | A | 5/1977 | Lennington et al. | 250/341.1 |
| 4,258,421 | A | 3/1981 | Juhasz et al. | 701/35 |
| 4,325,057 | A | 4/1982 | Bishop | 340/994 |
| 4,602,127 | A | 7/1986 | Neely et al. | 379/68 |
| 4,763,356 | A | 8/1988 | Day, Jr. et al. | 379/368 |
| 4,799,162 | A | 1/1989 | Shinakawa et al. | 701/117 |
| 4,804,937 | A | 2/1989 | Barbiaux et al. | 340/459 |
| 5,058,044 | A | 10/1991 | Stewart et al. | 702/184 |
| 5,068,656 | A | 11/1991 | Sutherland | 340/989 |
| 5,223,844 | A | 6/1993 | Mansell et al. | 342/357.07 |
| 5,321,629 | A | 6/1994 | Shirata et al. | 702/187 |
| 5,399,844 | A | 3/1995 | Holland | 235/376 |
| 5,459,304 | A | 10/1995 | Eisenmann | 235/380 |
| 5,459,660 | A | 10/1995 | Berra | 701/33 |
| 5,557,254 | A | 9/1996 | Johnson et al. | 340/426.19 |

(Continued)

OTHER PUBLICATIONS

"D.O.T. Driver Vehicle Inspection Reports on your wireless phone!" *FleeTTrakkeR* $_{LLC}$ *2002-2003 FleeTTrakkeR* $_{LLC}$ *—All rights reserved* <http://www.fleettrakker.com/web/index.jsp>.

(Continued)

*Primary Examiner*—Mark Hellner
(74) *Attorney, Agent, or Firm*—Ronald M. Anderson

(57) ABSTRACT

A vehicle with a positional tracking unit traverses a specific route while collecting actual route data that includes position data indicative of the actual route followed. The actual route data (including the position data) is stored as optimal route data for that specific route. Once the optimal route is defined and stored, future positional data (i.e., actual route data) collected during subsequent vehicle traversal of that specific route can be compared to the optimal route data. Whenever subsequently collected actual route data represents an improvement, as determined by one or more predefined criteria, the actual route data replaces the previously obtained optimal route data. Exception reports can be automatically generated by comparing the optimal route data to subsequently collected actual route data to determine when a deviation has occurred.

16 Claims, 3 Drawing Sheets

U.S. PATENT DOCUMENTS

| | | | | |
|---|---|---|---|---|
| 5,557,268 | A | 9/1996 | Hughes et al. | 340/933 |
| 5,585,552 | A | 12/1996 | Heuston et al. | 73/116 |
| 5,600,323 | A | 2/1997 | Boschini | 341/173 |
| 5,610,596 | A | 3/1997 | Petitclerc | 340/825.23 |
| 5,629,678 | A | 5/1997 | Gargano et al. | 340/573.4 |
| 5,671,158 | A | 9/1997 | Fournier et al. | 345/8 |
| 5,680,328 | A | 10/1997 | Skorupski et al. | 701/35 |
| 5,719,771 | A | 2/1998 | Buck et al. | 455/456.5 |
| 5,731,893 | A | 3/1998 | Dominique | 359/379 |
| 5,808,565 | A | 9/1998 | Matta et al. | 340/994 |
| 5,874,891 | A | 2/1999 | Lowe | 340/433 |
| 5,942,753 | A | 8/1999 | Dell | 250/338.1 |
| 5,995,898 | A | 11/1999 | Tuttle | 701/102 |
| 6,054,950 | A | 4/2000 | Fontana | 342/463 |
| 6,078,255 | A | 6/2000 | Dividock et al. | 340/539 |
| 6,107,917 | A | 8/2000 | Carrender et al. | 340/505 |
| 6,128,959 | A | 10/2000 | McGovern et al. | 73/660 |
| 6,169,943 | B1 | 1/2001 | Simon et al. | 701/29 |
| 6,236,911 | B1 | 5/2001 | Kruger | 701/1 |
| 6,253,129 | B1 | 6/2001 | Jenkins | 701/29 |
| 6,256,579 | B1 * | 7/2001 | Tanimoto | 701/201 |
| 6,396,413 | B2 | 5/2002 | Hines et al. | 340/825.49 |
| 6,456,039 | B1 | 9/2002 | Lauper et al. | 320/107 |
| 6,505,106 | B1 | 1/2003 | Lawrence et al. | 701/35 |
| 6,529,808 | B1 | 3/2003 | Diem | 701/29 |
| 6,539,296 | B2 | 3/2003 | Diaz et al. | 701/33 |
| 6,594,621 | B1 | 7/2003 | Meeker | 702/185 |
| 6,597,973 | B1 | 7/2003 | Barich et al. | 701/29 |
| 6,609,082 | B2 | 8/2003 | Wagner | 702/182 |
| 6,614,392 | B2 | 9/2003 | Howard | 342/357.07 |
| 6,664,897 | B2 | 12/2003 | Pape et al. | 340/573.3 |
| 6,671,646 | B2 | 12/2003 | Manegold et al. | 702/127 |
| 6,708,113 | B1 * | 3/2004 | Von Gerlach et al. | 701/210 |
| 2001/0053983 | A1 | 12/2001 | Reichwein et al. | 705/1 |
| 2002/0147610 | A1 | 10/2002 | Tabe | 705/1 |
| 2002/0150050 | A1 | 10/2002 | Nathanson | 370/241 |
| 2003/0030550 | A1 | 2/2003 | Talbot | 340/433 |
| 2003/0033061 | A1 | 2/2003 | Chen et al. | 701/33 |
| 2003/0109973 | A1 | 6/2003 | Hensey et al. | 701/35 |
| 2003/0120745 | A1 | 6/2003 | Katagishi et al. | 709/217 |
| 2004/0009819 | A1 * | 1/2004 | Koga | 464/51 |
| 2005/0273250 | A1 * | 12/2005 | Hamilton et al. | 701/200 |
| 2007/0179709 | A1 * | 8/2007 | Doyle | 701/209 |
| 2008/0154489 | A1 * | 6/2008 | Kaneda et al. | 701/201 |

OTHER PUBLICATIONS

"Detex Announces the Latest Innovation in Guard Tour Verification Technology." *DETEX Life Safety, Security and Security Assurance*. Jan. 1, 2003. 1pp. © 2002-2004 Detex Corporation. <http://www.detex.com/NewsAction.jspa?id=3>.

"Nextel, Motorola and Symbol Technologies Offer First Wireless Bar Code Scanner for Mobile Phones." *InvoiceDealers*.

"The data Acquisition Unit Escorte." *The Proxi Escort.com*. Nov. 20, 2001. 4 pp. © 2000 GCS General Control Systems. <http://www.gcs.at/eng/produkte/hw/escorte.htm>.

"Tracking out of route: software helps fleets compare planned routes to actual miles. (TECHNOLOGY)." *Commercial Carrier Journal*. Published Oct. 1, 2005. 4pp. NDN-219-1054-1717-0.

"What is the Child Check-Mate Safety System?" *2002@Child Checkmate Systems, Inc.* <http://www.childcheckmate.com/what.html>.

Albright, Brian: "Indiana Embarks on Ambitious RFID roll out." *Frontline Solutions*. May 20, 2002; 2 pp. Available at: <http://www.frontlinetoday.com/frontline/article/articleDetail.jsp?id=19358>.

Anonymous. "Transit agency builds GIS to plan bus routes." *American City & County*. vol. 118, No. 4. Published Apr. 1, 2003. 4pp. NDN-258-0053-0664-6.

Contact: GCS (UK), Tewkesbury Gloucestershire. Dec. 11, 2002. 2pp. Copyright © 2000 GCS General Control Systems <http://www.gcs.at?eng/newsallegemein.htm>.

Dwyer, H.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Kurtz, Jennifer. "Indiana's E-Government: A Story Behind It's Ranking." *INCONTEXT Indiana;s Workforce and Economy*. Jan.-Feb. 2003 vol. 4, No. 5pp. Available at <http://www.incontext.indiana.edu/2003/jan-feb03/governement.html>.

Quaan et al., "Guard Tour Systems." *Security Management ONLINE*. Sep. 16, 2003. 1pg. © 2000 Available at: <http://www.securitymanagement.com/ubb/Forum30/HTML/000066.html>.

Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, Nancy. "Inside RF/ID: Carving A Niche Beyond Asset Tracking." *Business Solutions*. Feb. 1999: 5pp. Available at: <http://www.businesssolutionsmag.com/Articles/1999_02/990208.html>.

Spencer, Nancy. "Maximize Your Exposure." *Business Solutions*. Feb. 1999: 5pp. Available at: <http://www.businesssolutionsmag.com/Articles/1999_02/990208.htm>.

Tiscor: The Mobile Software Solutions Provider. *Inspection Manager*: An Introduction and Slide Presentation; 19pp. Available: <www/TOSCOR.com>.

Tsakiri, M et al. Abstract: "Urban fleet monitoring with GPS and GLONASS." *Journal of Navigation*, vol. 51, No. 3. Published Sep. 1998. 2pp. NDN-174-0609-4097-3.

Tuttle, John R. "Digita RF/ID Enhances GPS" Proceedings of the Second Annual Wireless Symposium, pp. 406-411, Feb. 15-18, 1994, Santa Clara, CA.

Want, Roy, "RFID A Key to Automating Everything." *Scientific American* (Jan. 2004): 58-65.

* cited by examiner

FIG. 2
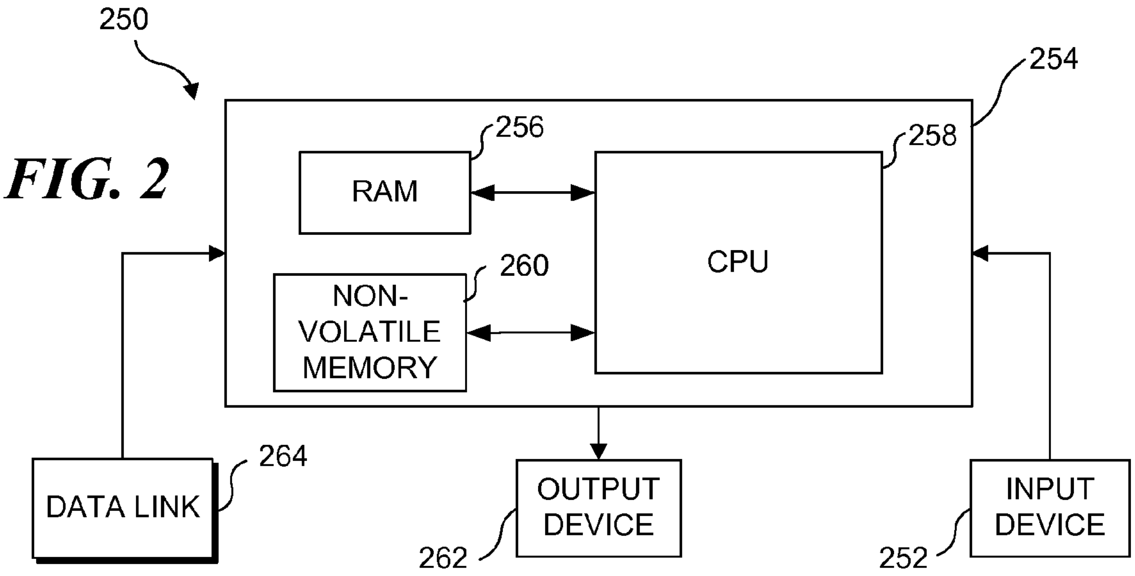
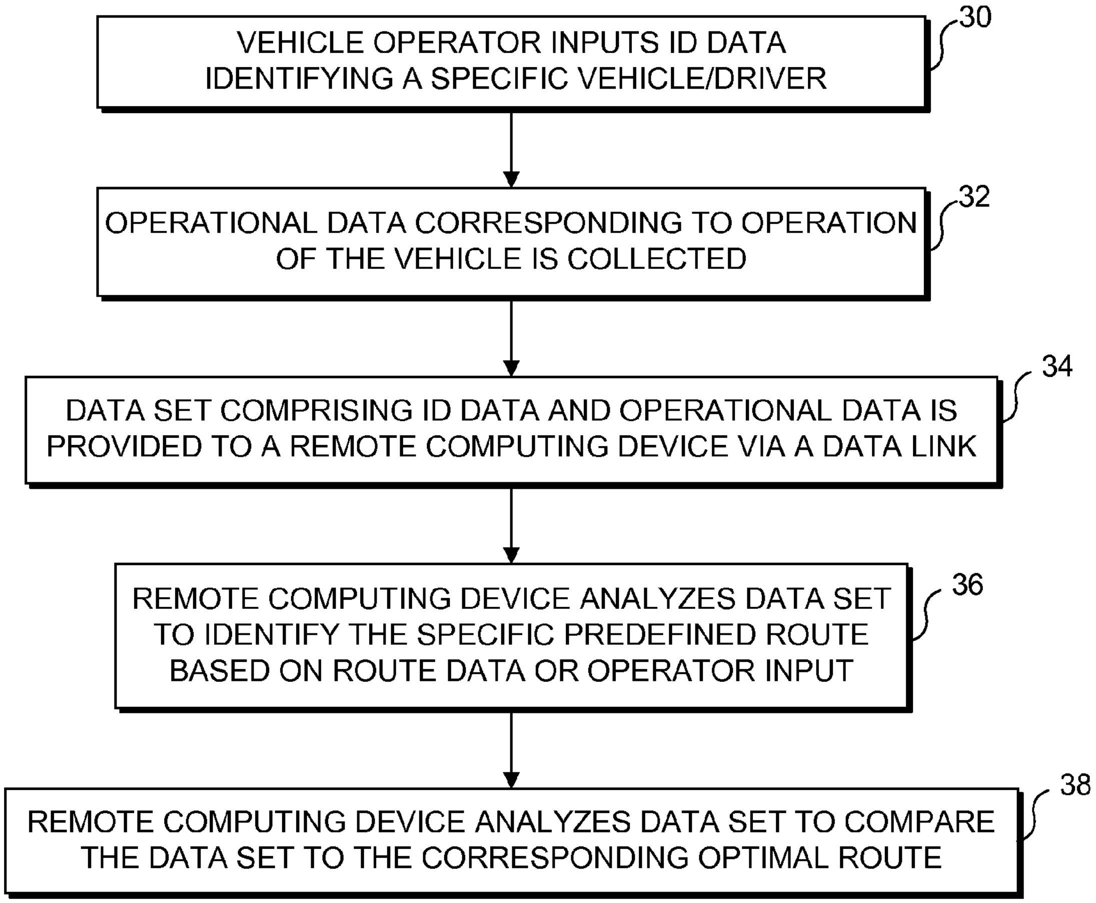
FIG. 3

METHOD AND APPARATUS TO UTILIZE GPS DATA TO REPLACE ROUTE PLANNING SOFTWARE

RELATED APPLICATIONS

This application is a continuation-in-part of prior co-pending application Ser. No. 11/425,222, filed on Jun. 20, 2006, the benefit of the filing date of which is hereby claimed under 35 U.S.C. §120.

BACKGROUND

As the cost of sensors, communications systems and navigational systems has dropped, operators of commercial and fleet vehicles now have the ability to collect a tremendous amount of data about the vehicles that they operate, including geographical position data collected during the operation of the vehicle.

Vehicle fleet operators often operate vehicles along predefined and generally invariant routes. For example, buses frequently operate on predefined routes, according to a predefined time schedule (for example, along a route that is geographically, as well as temporally defined). Preparing a predefined route can be a tedious task. Route planning software is available from a plurality of different vendors. As with any software application, a learning curve is involved. Furthermore, over time such predefined routes must be modified, to take into account changes in local traffic patterns, due to factors such as changes in traffic volumes on certain roads, road closures, and congestion due to road repairs and construction, requiring further use of route planning software to update an optimal route. The task of comparing actual driver performance using data (such as Global Positioning System (GPS) data) collected from vehicles traversing a predefined route with the optimal route can require one or more additional programs be used to perform the comparison.

It would be desirable to provide such fleet operators with additional means for developing optimal routes, to compare actual driver performance with the optimal route, and to update the optimal route in response to changes in traffic patterns.

SUMMARY

One aspect of the novel concepts presented herein is a method of using data collected in connection with operation of a vehicle to automatically define an optimal route, instead of using route planning software to define the optimal route. Once the optimal route is defined and stored, future positional data (i.e., actual route data) collected during vehicle operations can be compared to the optimal route data, to evaluate driver performance. As traffic conditions change, actual route data (i.e., positional data collected as a vehicle traverses a specific route) can be used to identify changes to the optimal route that provide a performance improvement. Whenever an improvement (such as a detour to avoid congestion due to an ongoing road construction project) appears to have value over an extended period, actual route data corresponding to the improved route can be used to redefine the optimal route. In this manner, actual route data is used to define the optimal route, so that route planning software is not required.

In at least one exemplary embodiment, the initial optimal route data collected for a route can be generated by equipping a vehicle with a positional tracking unit (such as a GPS tracking system, although it should be recognized that the use of GPS systems for this purpose is intended to be exemplary, rather than limiting), and operating the vehicle over the desired route to generate the optimal route data (i.e., a fingerprint of geographical position data, which may also comprise temporal data). The specific route can be initially planned using maps, local knowledge of traffic routes and conditions, route planning software, or any combination thereof (although one benefit of the concepts disclosed herein is that route planning software is not needed, it should be recognized that the initial route could be defined by route planning software). If desired, an initial route planning period can encompass more than one traverse of the predefined route. For example, route data can be collected during the course of a week (note that the specific time period of a week is intended to be exemplary, not limiting), with the route being varied during the week, so that actual route data from the week can be evaluated to identify the data defining the most efficient or optimal route. Generally, optimal route data represents actual route data collected from a vehicle traversing a route, where that traversal represents completion of the route in the least amount of time, although other factors, such as mileage and engine stress (as measured by factors such as engine revolutions per minute (RPM), oil temperature, and coolant temperature) can be used to determine when actual route data collected from a vehicle traversing a route represents the optimal route.

Once a specific set of positional data is identified as the optimal (or "golden") route, subsequently collected actual route data are compared with the optimal route data. Such evaluations can be used to identify drivers who deviate from the optimal route. At times, deviations can represent an occurrence that requires some warning or disciplinary action (i.e., a driver deviated from the optimal route for an unacceptable reason, such as to run a personal errand or to take a vehicle home instead of to the fleet yard). In other situations, such deviations may have been necessitated by changes in traffic conditions along the route, such as increased congestion on the route, due to high traffic volumes, an accident, or road construction. In some cases, the deviations may represent an improvement in efficiency over the earlier identified optimal route. When such an improvement occurs, the new and more efficient route can be brought to the attention of a route manager, who may decide that the more efficient actual route data should be used to redefine the golden or optimal route. Based on an evaluation of the new more efficient route, the route manager may offer suggestions to further tweak the route for still greater improvement, and a new route planning period may be enacted, where intentional route variations are implemented to further refine the optimal route. Alternatively, the actual route data representing the more efficient route thus determined can automatically replace the previously identified optimal route.

In other embodiments, such intentional variations are implemented on a regular or periodic basis (for example, intentional variations can be implemented monthly, although this monthly period is intended to be exemplary, and not limiting), and any efficiency improvements derived from the variations can be used to update the optimal route data. Thus, an important aspect of the concepts disclosed herein is that the optimal route evolves dynamically over time based on actual route data, as opposed to theoretical data provided by route planning software.

In an exemplary embodiment, actual route data are collected from vehicles as they traverse a predefined route. The actual route data are used initially to define an optimal route. Thereafter, actual route data are compared to the optimal route data. The actual route data can be collected and evaluated in real time (for example, the route data can be wirelessly transferred to a remote computing device for evaluation), or route data can be collected after the vehicle completes the route. When unjustified deviations from the optimal route by a driver reduce efficiency, disciplinary actions can be initiated where merited. When deviations from the optimal route increase efficiency, the optimal route can be redefined based on the more efficient actual route data.

In general, the actual route will be analyzed by a remote computing device. For example, the remote computing device can be a computing system controlled or accessed by the fleet operator. The remote computing device also can be operating in a networked environment, and in some cases, may be operated by a third party under contract with the fleet operator to perform such services. Thus, the actual route data can be conveyed via a data link with the remote computing device.

The basic elements of the exemplary embodiment include a vehicle that is to be operated by a vehicle operator, a route data collection unit (such as a GPS tracking device), a data link (which can be integrated into the GPS unit), and a remote computing device. In general, the remote computing device can be implemented by a computing system employed by an entity operating a fleet of vehicles. Entities that operate vehicle fleets can thus use such computing systems to track and process data relating to their vehicle fleet. It should be recognized that these basic elements can be combined in many different configurations to achieve the exemplary method discussed above. Thus, the details provided herein are intended to be exemplary, and not limiting on the scope of the concepts disclosed herein.

As noted above, the actual route data can include more than just geographical position data. Vehicle onboard computing devices are often configured to collect data from a variety of sensors integrated into the vehicle. Such sensor data are often communicated to the onboard computer via a J-bus, although such an embodiment is intended to be exemplary, rather than limiting. Sensor data can include brake temperature data, tire pressure data, oil temperature data, engine coolant temperature data, and other data corresponding to operational characteristics or conditions of the vehicle and its engine (or other form of prime mover). The other sensor data and the geographical position data will, in an exemplary embodiment, be combined into a data set unique to a specific operational period for a specific vehicle, to achieve actual route data for a given operational period. Alternatively, the actual route data can simply be data collected by a GPS or other geographical position sensing device.

The actual route data are then conveyed to the remote computing device for subsequent analysis of the actual route data (or initially, to define the optimal route; as noted above, the first set of actual route data for a given route can be used as the default optimal route, to be replaced by subsequently obtained actual route data that represents an improvement over the earlier route data). The analysis can include identifying exceptions (i.e., deviations from the optimal route), identifying trends (such as an increase in route time or an increase/decrease in efficiency, perhaps due to changes in traffic congestion, a change in traffic patterns, or road construction; such a trend can merit re-evaluation of the optimal route), and identifying deviations that increase efficiency or performance. Whenever an improvement to the optimal route is identified, the optimal route can be redefined, such that the actual route data corresponding to the improvement are used to define the new optimal route. The actual route data can be conveyed to the remote computing device in a variety of ways, for example, using a wireless communication (such as radio frequency or IR data transfer), a hardwired interface, or by storage on portable memory storage media that can be physically moved to a desired location for data retrieval. If desired, the actual route data can be transmitted to the remote computing device in real-time, for example, if the vehicle is equipped with radio or cellular communication capability useful for this purpose. In one embodiment, the remote computing device parses the actual route data to locate route identifier data (which is preferably input by a driver at the beginning of the route), thereby enabling identification of which one of a plurality of predefined routes matches the route identifier data, so that corresponding optimal route data can be compared to the subsequently collected actual route data.

With reference an alternative exemplary embodiment in which no route identifier is required, the geographical position data portion of the actual route data is used (as opposed to the route identifier data) to determine to which optimal route the actual route data corresponds. The optimal route data (which itself can comprise previously collected actual route data) for each predefined route operated by a fleet operator will be collected (and generally stored in a memory accessible by the remote computer). Significantly, while some routes may share one or more GPS data points in common (because of overlapping portions of the routes), each route will be generally defined by a unique collection of GPS data points (i.e., each route will exhibit a unique fingerprint of points along the route). When the GPS data collected by a particular vehicle are analyzed, the data can quickly be correlated with the particular route/fingerprint of a corresponding optimal route, to enable a fleet operator to rapidly determine the route completed by the vehicle, and to enable the subsequently collected actual route data to be compared to the optimal route data. The actual route data can include geographical position data only, or both positional data and temporal data. The addition of temporal data will be useful when a fleet operator has numerous routes that share common positional features. The additional metric of time can enable routes having common geographic data to be more readily distinguishable. Another aspect of the novel concepts presented herein is directed to a system for implementing the functional steps generally as described above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 2 is a functional block diagram of an exemplary computing device that can be employed to implement some of the method steps disclosed herein;

FIG. 3 is a flow chart showing method steps implemented in an exemplary embodiment in which a driver inputs data identifying the route, to facilitate identification of the corresponding optimal route data;

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive.

As used herein and in the claims that follow, the term specific route is intended to refer to a route between a starting location and an ending location, that is intended to be traversed a plurality of times. For example, bus operators generally operate buses on a number of different specific routes, which are generally differentiated by a route number. A bus Route 51 might connect a shopping mall and an airport, while a bus Route 52 might connect the airport to a university. Route 51 and Route 52 are each different specific routes. A specific route may include one or more intermediate locations disposed between the starting location and the ending location, such intermediate locations representing geographical locations that the specific route intersects. A specific route may change over time; with intermediate locations being added or deleted from time to time. For example, bus Route 51 between the shopping mall and the airport may add or eliminate various bus stops between the airport and the shopping mall over time, but despite such changes, that bus route remains bus Route 51, a recognizable specific route. For any given specific route, there may be more than one possible path connecting the locations defining the specific route (a path being a set of geographical coordinates that can be navigated in a specific order to traverse a specific route). The term actual route data as employed herein and in the claims that follow refers to a set of data including the geographical coordinates (i.e., geographical position data) navigated by a vehicle as it traverses a specific route. Traversing a specific route using different paths will thus yield different actual route data. The term optimal route (and optimal route data), as used herein and in the claims that follow, refers to a set of data including the geographical coordinates corresponding to a particular path that has been identified as being preferred to other possible paths that can be used to traverse a specific route. In absolute terms, the optimal route may not be the best possible path, it simply is the path that has currently been defined as the optimal route. Preferably, when a better path is identified, the optimal route is redefined. Standards for evaluating whether one path (i.e., one set of actual route data) is better than another path are discussed in greater detail below.

Figure 1:
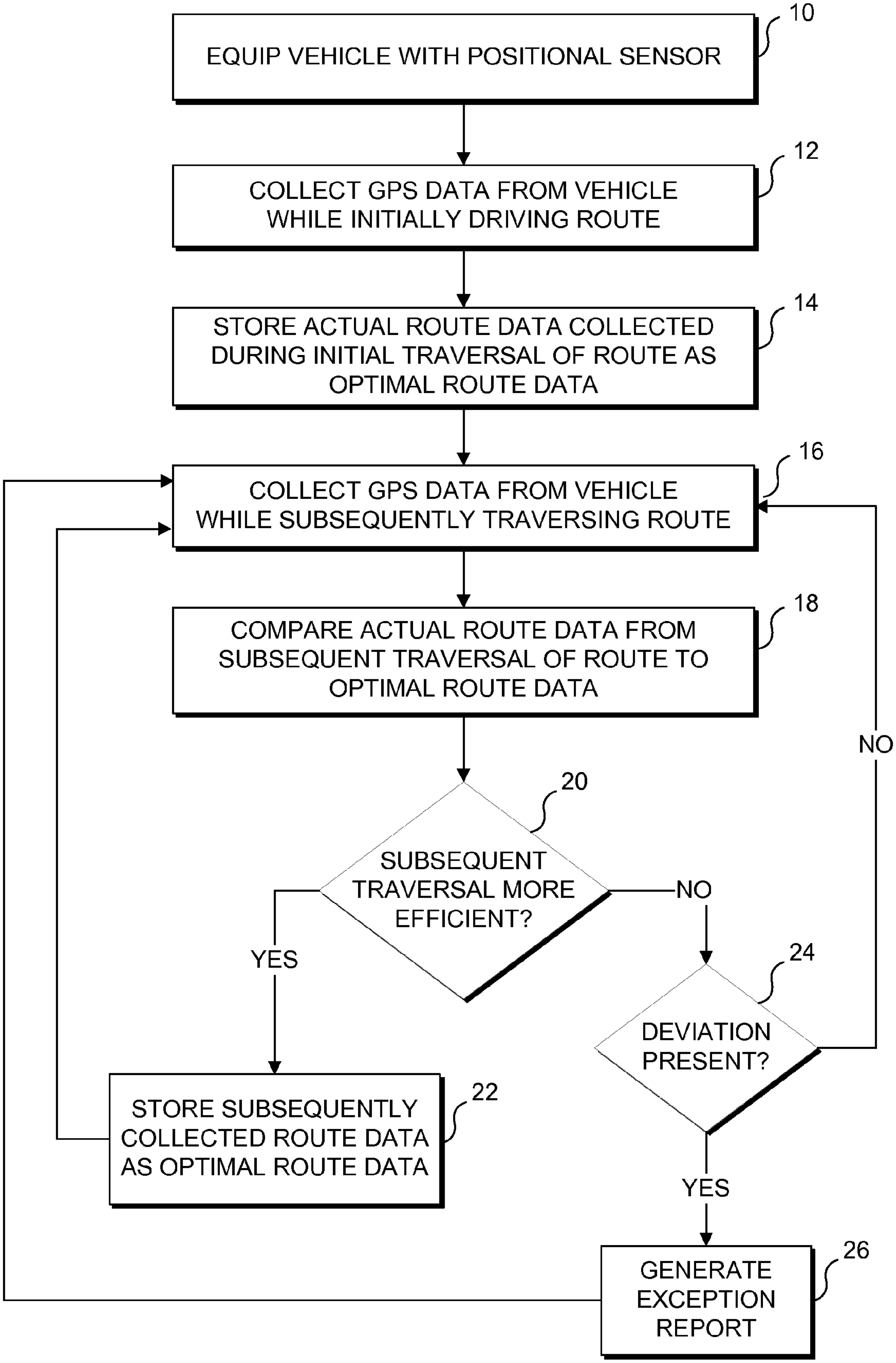
FIG. 1 is a high level logic diagram showing exemplary overall method steps implemented in accord with the concepts disclosed herein to utilize geographical position data collected while a vehicle is traversing a route to generate optimal route data, which can avoid the use of route planning software.

FIG. 1 is a high level flow chart showing the overall method steps implemented in accord with one aspect of the concepts disclosed herein, to utilize geographical position data collected from a vehicle traversing a specific route to determine optimal route data for that route. In a block 10, a vehicle is equipped with geographical position sensors (such as a GPS unit), so that geographical position data can be collected when the vehicle is being operated. In a block 12, the vehicle is operated to initially traverse a specific route with the GPS unit activated, and collects geographical position data corresponding to the specific route. As noted above, various techniques can be used to determine the initial route (i.e., the initial path). For example, the initial route can be planned using maps, local knowledge of roads and traffic patterns, with the use of route planning software (although in at least one embodiment, no route planning software is employed), or some combination thereof. In a block 14, the GPS data collected while traversing the route initially are stored (in at least one embodiment, the GPS data are stored as a "fingerprint" of different geographical positions encountered during traversal of the route) and are designated as the optimal route data (that is, it is assumed that the first traversal of the route corresponds to an initial optimal traversal of the route). Note that actual route data (i.e., GPS data) are used to define the optimal route. As noted above, in some embodiments, additional data collected while the vehicle traverses the route are included in the actual route data that is used to define the optimal route data. The additional data can include, but are not limited to, engine hours accumulated traversing the route, mileage traveled while traversing the route, engine temperature measured while traversing the route, oil temperature measured while traversing the route, coolant temperature measured while traversing the route, and engine RPMs measured while traversing the route.

In a block 16, the route is subsequently traversed again, also using a vehicle equipped to collect GPS data, and this subsequent traversal generates actual route data. In a block 18, the actual route data for the subsequent traversal are compared to the optimal route data. In a simple exemplary embodiment, such a comparison only determines the data that corresponds to the least time required to complete the route. If in a decision block 20, it is determined that the subsequent route data represents an improvement over the optimal route data (i.e., if the actual route data for the subsequent traversal is more efficient than the optimal route data), the previous optimal route data are replaced with the subsequent actual route data (i.e., the subsequent route data then becomes the new optimal route data) in a block 22. It should be recognized that many parameters other than time required to complete the route can be used to evaluate whether the subsequent traversal of the route was performed more efficiently than the alternative traversal of the route. Factors such as those identified above with respect to the additional data can be used to compare the optimal route data with subsequently obtained actual route data. Whenever an improvement is identified, the actual route data for the subsequent traversal of the route can automatically be applied to replace the optimal route data, or a route manager can be informed of the improvement, so that the route manager (or other pertinent individual tasked with making such a decision) can determine whether the optimal route data should be replaced with the subsequently obtained actual route data. Once the subsequently obtained actual route data are used to redefine the optimal route, then the method is ready to collect additional actual route data during yet another subsequent traversal of the route, as indicated by the link between block 22 and block 16.

Referring once again to decision block 20, if it is determined that the subsequent traversal of the route is not more efficient than the optimal route as defined by the optimal route data, then in a decision block 24, it is determined whether any deviations between the optimal route data and the actual route data collected in the subsequent traversal have occurred. Such deviations can include missed stops, additional mileage required to complete the route, additional time required to complete the route, higher engine RPMs required during completion of the route, more fuel required during completion of the route, higher engine temperature reached during completion of the route, higher oil temperature reached during completion of the route, higher coolant temperature reached during completion of the route, and/or that a predefined boundary based on the optimal route was breached (for example, the driver ran a personal errand, or took the vehicle home rather than to a fleet yard). If so, then in a block 26 an exception report is generated. The method is then ready to collect additional actual route data for the next (i.e., yet another) traversal of the route, as indicated by the link between block 26 and block 16. Note that generation of an exception report may result in a disciplinary action, if it is determined that a driver of the vehicle violated a fleet policy. In some cases, a deviation will be permissible, because the deviation was required due to traffic conditions, such as accidents or road construction. It should also be recognized that an exception report may not be generated until any deviation exceeds a predefined value. For example, a fleet operator may determine that any reduction in time required to complete a traversal of the route never requires an exception report (as such a reduction in time is generally considered beneficial). Other fleet operators may want exception reports generated even when the deviation represents an increase in efficiency, so that the route manager can study route data representing increases in efficiency. Still other fleet operators may allow deviations of up to a certain percentage change (or other predefined limit) before an exception report is issued, recognizing that regularly changing traffic patterns will cause subtle variations in the route data.

Referring once again to decision block 24, if no deviation is identified, then the method is ready to collect additional actual route data for yet another subsequent traversal of the route, as indicated by the link between block 24 and block 16.

Note that the method described above enables optimal route data to be initially defined, and then regularly dynamically updated when improvements are identified, without requiring the use of route planning software. It should also be recognized that some fleet operators may choose to intentionally vary a subsequent traversal of a route from the optimal route, in order to determine if the variation leads to an improvement. Such intentional variations can be instituted on a case-by-case basis (for example, when exception reports note a trend of decreasing efficiency over time, perhaps due to changes in long term traffic patterns, routes, or traffic volumes), or can be regularly (i.e., periodically) scheduled (e.g., on a weekly, bi-weekly, or monthly basis, it being understood that such intervals are intended to be exemplary and not limiting).

Fleet operators generally operate vehicles over a plurality of different routes. Several techniques can be used to enable optimal route data for a particular route to be correlated to actual route data collected during subsequent traversal of the route. The vehicle operator can input a route identifier (ID) into a data input device that is logically coupled with the geographical position sensor employed to track the vehicle's position as it traverses the route. The route ID can then be incorporated into the actual route data, such that when the actual route data are compared to the optimal route data, the route ID enables the corresponding optimal route data to be identified (because the corresponding optimal route data will include the same route ID). Alternatively, the actual route data can be compared to the optimal route data for all of the fleet operator's routes, until a best match is found. The geographical positions in each set of actual route data and in each set of optimal route data can be considered analogous to fingerprints, and conventional data processing techniques can be used to rapidly determine which set of optimal route data most closely corresponds to a set of subsequently obtained actual route data. Unless the subsequent traversal of a specific route varies significantly from the optimal route as defined by the optimal route data, the subsequently collected actual route data should be able to be matched to the corresponding optimal route data.

In general, analysis of the actual route data (i.e., comparing subsequently obtained actual route data to previously determined optimal route data) will be carried out by a remote computing device. The remote computing device in at least one embodiment comprises a computing system controlled or accessed by the fleet operator. The remote computing device can be operating in a networked environment, and in some cases, may be operated by a third party under contract with the fleet operator to perform such services. FIG. 2 schematically illustrates an exemplary computing system 250 suitable for use in implementing the method of FIG. 1 (i.e., for executing blocks 18, 20, 22, 24, and 26 of FIG. 1). Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of data collected in connection with operation of the vehicle to determine how closely a subsequent traversal of a specific route corresponds to the optimal route. The machine instructions implement functions generally consistent with those described above with respect to blocks 18, 20, 22, 24, and 26 of FIG. 1, as well as those described below in a block 36 and a block 38, with respect to FIG. 3. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are an operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to compare subsequently collected actual route data with optimal route data, to identify any deviations and/or efficiency improvements). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. Data link 264 is configured to enable data collected in connection with operation of a vehicle to be input into computing system 250 for subsequent analysis to compare subsequent route data with optimal route data, to identify any deviations and/or efficiency improvements. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

FIG. 3 is a high level flow chart showing the overall method steps implemented in accord with another exemplary embodiment for comparing subsequent route data with optimal route data, to identify any deviations and/or efficiency improvements. In a block 30, a user (hereinafter referred to as the operator, since generally, the user will be the operator of the vehicle, although it should be recognized that other individuals, such as fleet maintenance personnel or supervisors can be assigned to carry out this and other tasks discussed herein) inputs route identification data into a memory, so that the route identification data can be combined with other data to generate a data set corresponding to a specific vehicle operated during a specific period of time. As noted above, such a route ID facilitates correlation of subsequently collected actual route data with previously identified optimal route data, enabling a comparison of the subsequent route data with the optimal route data to be made. In general, the memory can be incorporated into the vehicle (such as memory associated with an onboard computing device or a geographical positioning sensor, such as a GPS unit), or the memory can be associated with a portable electronic device (such as a portable electronic data collection device used by the operator to collect the other data). In a block 32, operational data corresponding to operation of the vehicle are collected. This data will at least include the geographical position data that is included in the actual route data. As described in greater detail below, these other data can also be added to the actual route data. The other data can be collected before the vehicle is operated over a specific predefined route (such as pre-trip vehicle inspection data), or the other data can comprise operational/vehicle parameters collected during operation of the vehicle over a specific predefined route (data such as brake temperature data, engine temperature data, coolant temperature data, and tire pressure data, although it should be recognized that such types of data are intended to be exemplary rather than limiting on the scope of this approach), or both types of data. In a block 34, a data set (i.e., the actual route data) comprising the route ID data input by the operator, the geographical position data, and any other operational data (i.e., the other data—if used) is conveyed to a remote computing device via a data link. It should be recognized that, depending on the specific configuration of the vehicle, the data set can be conveyed after a trip over a specific predefined route has been completed, or in real-time while the route is being traveled by the vehicle (the real-time embodiment requires a vehicle to be equipped with a wireless communications data link). In a block 36, the data set is analyzed to identify a specific predefined route over which the vehicle has been operated (i.e., the data set is parsed to identify the route ID, which is then used to identify a particular one of the plurality of predefined routes over which the vehicle traveled, to enable the corresponding optimal route data to be identified). In a block 38, the corresponding optimal route data are compared with the actual route data, to identify any deviations and/or efficiency improvements. Generally as discussed above, if the actual route data represent an improvement over the optimal route data, the actual route data replace the optimal route data (i.e., a new optimal route is defined based on the subsequently collected actual route data representing the improvement). Exception reports can be generated to note any deviations between the subsequently collected actual route data and the optimal route data.

Figure 4:
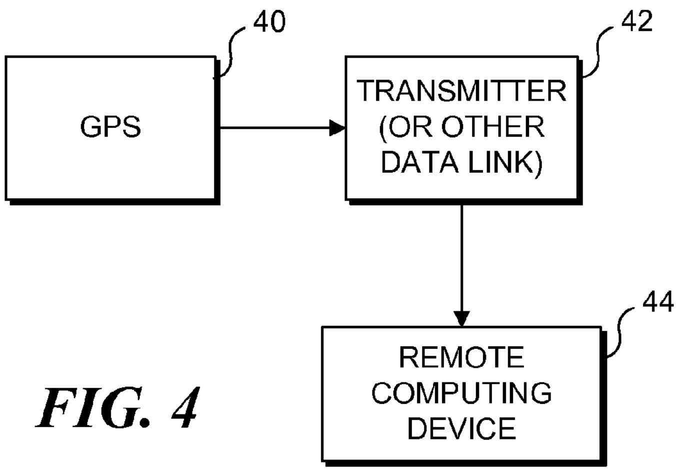
FIG. 4 is an exemplary functional block diagram showing the basic functional component used to implement the method steps of FIG. 1.

FIG. 4 is a schematic block diagram of exemplary functional components that can be employed to implement the method steps of FIG. 1. The components include a GPS unit 40, a transmitter 42, which will may also have a corresponding receiver—not shown (or other data link), and a remote computing device 44 (generally as described above). It should be recognized that many GPS units are available that already incorporate a transmitter, such that a separate transmitter may not be required. It should be understood that the concepts disclosed herein can be used with other types of geographical position sensors/systems, and the use of the term GPS is intended to be exemplary, rather than limiting.

Figure 5:
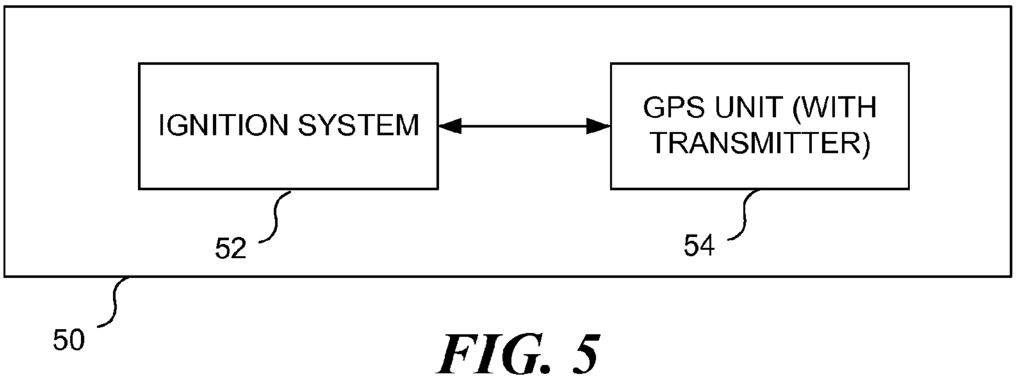
FIG. 5 is a schematic block diagram of a first exemplary vehicle configured to collect the geographical position data employed in the method steps of FIG. 1.

FIG. 5 is a schematic block diagram of an exemplary vehicle configured to collect the geographical position data employed in the method steps of FIG. 1. A vehicle 50 includes GPS unit 54 (which in this embodiment, includes a transmitter, although it should be recognized that a GPS unit without a transmitter can be coupled with a transmitter or other data link to achieve similar functionality). GPS unit 54 is coupled to ignition system 52, so that geographical position data are collected only when the ignition system is on (this configuration is intended to be exemplary, but not limiting).

Figure 6:
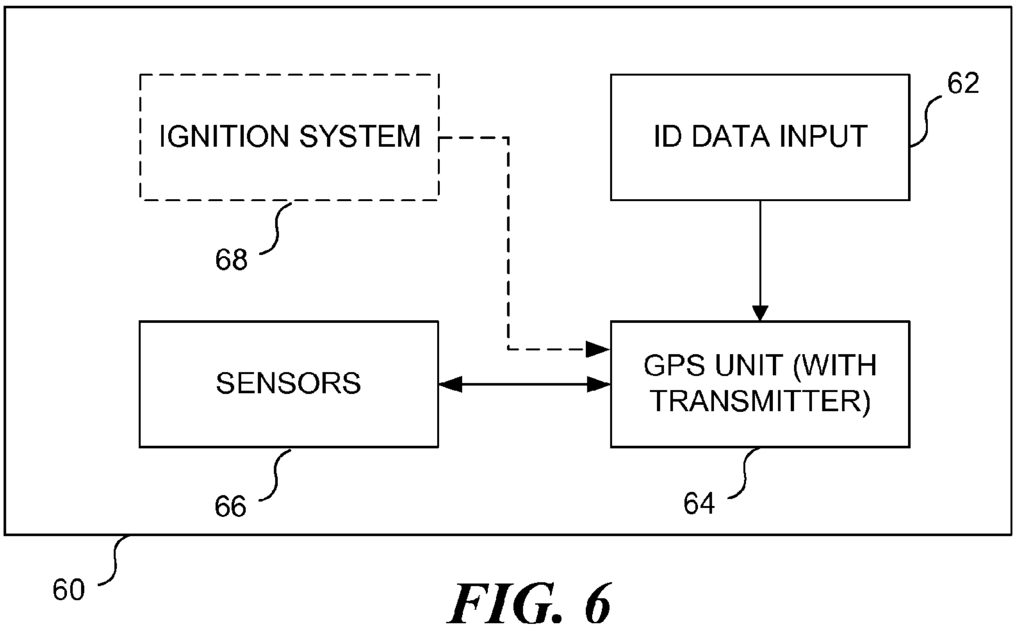
FIG. 6 is a schematic block diagram of a second exemplary vehicle configured to collect the geographical position data employed in the method steps of FIG. 3.

FIG. 6 is a functional block diagram of exemplary functional components of a vehicle employed to implement the method steps of FIG. 3. A vehicle 60 includes GPS unit 64 (which in this embodiment, includes a transmitter, although it should be recognized that a GPS unit without a transmitter can be coupled with a transmitter or other data link to achieve similar functionality). GPS unit 64 is optionally coupled to ignition system 68, so that geographical position data are collected only when the ignition system is on (such a configuration is intended to be exemplary, but not limiting). Vehicle 60 further includes sensors 66, and an ID data input 62.

In general, route identification data input 62 comprises a keyboard or function keys logically coupled to GPS unit 64. It should be recognized, however, that other data input structures (i.e., structures other than keyboards) can instead be implemented, and that the concepts disclosed herein are not limited to any specific identification data input device. The operator can also use a handheld electronic data collection device to scan a token that uniquely corresponds to a specific one of the plurality of the predefined routes. For example, the operator can be provided with a plurality of tokens, each of which uniquely corresponds to a different one of the plurality of predefined routes, such that the user selects the appropriate token, and uses the handheld electronic data collection device to scan the appropriate token to input the ID for the selected route. Many different tokens/sensor combinations can be implemented. Barcodes and optical scanners represent one combination, while radio frequency identification (RFID) tags and RFID readers represent another such combination. The advantage of a token/sensor combination is that the handheld electronic data collection device is not required to incorporate a keypad for entry of the route identification data. As a further alternative, the route identification data can be entered verbally, using voice recognition software that can recognize and interpret the verbal input. In embodiments where the route identification data are entered into a portable electronic data collection device, the portable electronic data collection device can also be employed to collect other operational/vehicle data (i.e., operational data other than GPS data, monitored by sensors 66). Alternatively, the other operation data collected from sensors 66 can be conveyed to an onboard computer, or to GPS unit 64, to be combined with the GPS data and the route ID data, to provide the actual route data for transmittal to the remote computing device. The other operational data can include inspection data and/or data collected from sensors incorporated into the vehicle (e.g., sensors configured to collect data such as engine temperature data, oil temperature data, brake temperature data, tire pressure data, and tire temperature data, it being understood that such types of data are intended to be exemplary, rather than limiting).

It should be recognized that alternative configurations to enable the actual route data for a subsequent traversal of a specific route to be conveyed to a remote computer can be employed. For example, GPS data and the route ID data can be stored in an onboard computer, and then conveyed to a remote computer by a variety of different data links, including hard wired data transmission, wireless data transmission, and data transmission accomplished by carrying a portable data storage device from the vehicle to the site of the remote computer. The specific type of data link employed is not significant. Those of ordinary skill in the art will recognize that data can be communicated in a variety of different ways, including, but not limited to, via serial data ports, parallel data ports, USB data ports, infrared communication ports, Firewire ports, and/or using radio frequency transmitter/receivers that are linked in communication.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for automatically defining optimal route data for a specific route to be traversed by a vehicle, where the specific route will be traversed a plurality of different times, comprising the steps of:

(a) initially traversing the specific route using a vehicle equipped to collect vehicle geographical position data while the vehicle is traversing the specific route, to obtain actual route data for the initial traversal of the specific route, wherein the actual route data includes the vehicle geographical position data;

(b) transmitting the actual route data to a remote computing device;

(c) using the remote computing device, initially defining the optimal route data based on the actual route data collected while initially traversing the specific route;

(d) completing a subsequent traversal of the specific route with a vehicle, while collecting vehicle geographical position data during the subsequent traversal, to obtain actual route data for the subsequent traversal of the specific route, wherein the actual route data for the subsequent traversal of the specific route includes the vehicle geographical position data for the vehicle collected during the subsequent traversal;

(e) transmitting the actual route data for the subsequent traversal of the specific route to the remote computing device;

(f) using the remote computing device, comparing the actual route data collected during the subsequent traversal of the specific route with the optimal route data, and if the actual route data collected during the subsequent traversal represents an improvement over the optimal route data as determined by one or more predefined criteria, then redefining the optimal route data based on the actual route data collected during the subsequent traversal.

2. The method of claim 1, further comprising the step of planning the initial traversal of the specific route without using route planning software, such that the optimal route data is initially generated without requiring the use of route planning software to determine the route initially followed by the vehicle during the initial traversal of the specific route.

3. The method of claim 1, further comprising the step of matching a route identification included in the actual route data for the subsequent traversal with a route identification included in the optimal route data, before comparing the actual route data collected during the subsequent traversal of the specific route with the optimal route data.

4. The method of claim 1, further comprising the step of matching a fingerprint of the actual route data for the subsequent traversal with a fingerprint of the optimal route data to ensure that the actual route data is for the same specific route as the optimal route data, before comparing the actual route data collected during the subsequent traversal of the specific route with the optimal route data.

5. The method of claim 1, wherein the step of subsequently traversing the specific route comprises the step of intentionally deviating from the previously determined optimal route data, in order to determine if such a deviation results in an improvement of the actual route data relative to the optimal route data while traversing the specific route.

6. The method of claim 1, wherein the step of comparing actual route data collected during the subsequent traversal with the optimal route data comprises the step of generating an exception report whenever the actual route data deviates from the optimal route data by more than a predefined value in at least one category.

7. The method of claim 6, wherein the predefined value comprises at least one element selected from the group consisting essentially of: an engine temperature reached while traversing the specific route; an oil temperature reached while traversing the specific route; a coolant temperature reached while traversing the specific route; a maximum engine revolutions per minute value reached while traversing the specific route; and, a number of engine operating hours required to traverse the specific route.

8. The method of claim 1, wherein the step of comparing the actual route data collected during the subsequent traversal with the optimal route data comprises the step of generating an exception report whenever the actual route data for the subsequent traversal does not represent an improvement over the optimal route data, and the actual route data deviates from the optimal route data.

9. The method of claim 1, wherein steps (b) and (d) are implemented by a processor.

10. The method of claim 1, wherein step (d) is implemented by a processor.

11. A system for automatically defining optimal route data for a vehicle traversing a specific route, without using route planning software to develop the optimal route, comprising:

(a) a memory in which a plurality of machine instructions are stored;

(b) a data link for communicating geographical position data collected while operating the vehicle; and (c) a processor coupled to the memory and to the data link, said processor executing the machine instructions to carry out a plurality of functions, including:

(i) upon receipt of actual route data collected while a vehicle traverses the specific route for a first time, automatically storing the actual route data as optimal route data, where the actual route data comprises vehicle geographical position data collected while the specific route is initially being traversed; and (ii) automatically comparing actual route data collected while a vehicle subsequently traverses the specific route with the optimal route data, and if the actual route data collected during the subsequent traversal represents an improvement over the optimal route data, as determined by one or more predefined criteria, then storing the actual route data collected during the subsequent traversal as the optimal route data.

12. A method for defining optimal route data for a specific route, without using route planning software, comprising the steps of:

(a) initially traversing the specific route using a vehicle equipped to collect vehicle geographical position data while the vehicle is traversing the specific route, to obtain actual route data for the initial traversal of the specific route, wherein the actual route data includes the vehicle geographical position data;

(b) transmitting the actual route data to a remote computing device;

(c) using the remote computing device, storing the actual route data collected while initially traversing the specific route, as the initial optimal route data;

(d) completing a subsequent traversal of the specific route with a vehicle, while collecting vehicle geographical position during the subsequent traversal, to obtain actual route data for the subsequent traversal of the specific route, wherein the actual route data for the subsequent traversal of the specific route includes the vehicle geographical position data for the vehicle collected during the subsequent traversal;

(e) transmitting the actual route data for the subsequent traversal of the specific route to the remote computing device; and (f) using the remote computing device, comparing the actual route data collected during the subsequent traversal of the specific route with the optimal route data, and if the actual route data collected during the subsequent traversal represents an improvement over the optimal route data, as determined by one or more predefined criteria, then storing the actual route data collected during the subsequent traversal as the optimal route data.

13. The method of claim 12, wherein the step of completing a subsequent traversal of the specific route comprises the step of intentionally deviating from the specific route, as defined by the optimal route data, in order to determine if such a deviation results in an improved performance while traversing the specific route.

14. The method of claim 12, wherein the step of comparing the actual route data collected during the subsequent traversal with the optimal route data comprises the step of generating an exception report whenever the subsequent traversal does not represent an improvement over the optimal route data, and the actual route data deviates from the optimal route data.

15. The method of claim 12, wherein steps (b) and (d) are implemented by a processor.

16. A system for automatically defining optimal route data for a vehicle traversing a specific route, where the specific route will be traversed a plurality of different times, comprising:

(a) a memory in which a plurality of machine instructions are stored;

(b) a data link for communicating geographical position data collected in connection with operation of the vehicle; and (c) a processor, coupled to the memory and to the data link, said processor executing the machine instructions to carry out a plurality of functions, including:

(i) upon receipt of actual route data collected while a vehicle traverses a specific route for a first time, automatically defining the actual route data as optimal route data, where the actual route data comprises vehicle position data collected while the specific route is initially traversed; and (ii) automatically comparing actual route data collected while a vehicle subsequently traverses the specific route with the optimal route data, where the actual route data comprises vehicle position data collected while the vehicle subsequently traverse the specific route, and based on the comparison, implementing at least one of the following steps:

(A) if the actual route data collected during the subsequent traversal represents an improvement over the optimal route data, as determined by one or more predefined criteria, then redefining the optimal route data based on the actual route data collected during the subsequent traversal;

(B) generating an exception report whenever the actual route data deviates from the optimal route data by more than a predefined value in at least one category; and (C) generating an exception report whenever the subsequent traversal does not represent an improvement over the optimal route data, as determined by one or more predefined criteria, and the actual route data deviates from the optimal route data.

* * * * *